United States Patent
Tanaka et al.

[19]

[11] Patent Number: 6,148,136
[45] Date of Patent: Nov. 14, 2000

[54] RECORDING APPARATUS, REPRODUCING APPARATUS, AND CONVERSION APPARATUS

[75] Inventors: Shinya Tanaka, Moriguchi; Takayasu Yoshida, Toyono-gun; Hideki Otaka, Neyagawa; Shinichi Togawa, Sakai, all of Japan

[73] Assignee: Matsushita Electric Industrial Co., Ltd., Osaka, Japan

[21] Appl. No.: 09/011,550

[22] PCT Filed: Jun. 5, 1997

[86] PCT No.: PCT/JP97/01965

§ 371 Date: Feb. 6, 1998

§ 102(e) Date: Feb. 6, 1998

[87] PCT Pub. No.: WO97/47132

PCT Pub. Date: Dec. 11, 1997

[30] Foreign Application Priority Data

Jun. 6, 1996 [JP] Japan ................................. 8-144029

[51] Int. Cl.[7] .................................................. H04N 5/91
[52] U.S. Cl. .............................. 386/46; 386/131; 348/441
[58] Field of Search ................................. 386/1, 31, 33, 386/36, 37, 40, 44, 46, 92, 131, 109, 111, 112, 122, 123, 124, 52; 375/242; 360/18, 22, 23, 32, 13, 15; 345/526; 348/441, 443, 445, 458, 459, 448, 449; 358/445

[56] References Cited

U.S. PATENT DOCUMENTS

| | | | |
|---|---|---|---|
| 4,961,204 | 10/1990 | Tanaka et al. ........................... | 375/242 |
| 5,303,342 | 4/1994 | Edge ....................................... | 345/526 |
| 6,038,368 | 3/2000 | Boetje et al. ............................ | 386/52 |

FOREIGN PATENT DOCUMENTS

| | | |
|---|---|---|
| 6-103695 | 4/1994 | Japan . |
| 07023335 | 1/1995 | Japan . |
| 07226022 | 8/1995 | Japan . |
| 7-226026 | 8/1995 | Japan . |
| 8-306136 | 11/1996 | Japan . |

OTHER PUBLICATIONS

Japanese language search report dated Sep. 2, 1997 for Int'l Application No. PCT/JP97/01965.

English Translation of Japanese language search report for Int'l Appln. No. PCT/JP97/01965.

*Primary Examiner*—Wendy Garber
*Assistant Examiner*—Christopher Onuaku
*Attorney, Agent, or Firm*—Ratner & Prestia

[57] ABSTRACT

Among the recording/reproducing apparatus such as digital VCR, recording/reproducing and converting may be conducted using digital interface even if there are difference in the type of audio sampling and video compression. DV bus data is provided at digital I/F circuit 2, and A/V separator 101 separates the data into audio and video. The separated audio data undergoes the de-interleave processing at de-interleave instrument 102, and the rate conversion at rate converter 103. The rate- converted audio data undergoes the frame sequence processing and interleave processing at interleave instrument 104. While, the video data is delayed at delay memory 105, where the delay in the audio data processing is taken into account. These audio data and video data are multiplexed at A/V multiplexer 106 to output the DV bus data 3, which is recorded after having been applied with due processing for recording.

22 Claims, 12 Drawing Sheets

RECORDING APPARATUS, REPRODUCING APPARATUS, AND CONVERSION APPARATUS

This application is a U.S. National Phase Application of PCT International Application PCT/JP97/01965, filed Jan. 5, 1997.

TECHNICAL FIELD

The present invention relates to a digital interface for transmitting/receiving high-efficiency encoded digital video signal, etc. with each other among the recording/reproducing apparatuses, such as digital VCR, which record and reproduce high-efficiency encoded digital video signal, etc.

BACKGROUND ART

The digital interface is a data transmitting means in a recording/reproducing apparatus such as VCR. Among said recording/reproducing apparatuses is a consumer-use digital VCR which records/reproduces high-efficiency encoded video data and non-compression voice data stored in a compact cassette, called the DV Format. The DV Format is described in the consumer-use VCR specifications introduced by The HD Digital VCR Conference (Data Compression and Digital Modulation, The Consumer-use Digital VCR;—consolidating, as a first step, the existing specifications of TV signals", pages 137–150, NIKKEI ELECTRONICS BOOKS). Also there is a report available on the digital interface of the DV Format (Digital Interface for Digital VCR", VIR95 - 56, Technical Report of The Institute of Television Engineers of Japan), which refers to the transmission of compressed video data and interleaved audio data in the DV Format using the IEEE1394 (hereinafter referred to as 1394). The format for transmitting digital data using the 1394 is called AV Protocol; in the digital VCR specifications, video data and audio data etc. on a tape are transmitted as the line of 80-byte block data called DIF block. In a case of the 525 scanning line/60 field" (hereinafter referred to as 525/60 system) signal, for example, 150 DIF blocks form 1 DIF sequence, 10 DIF sequences form 1 video frame, as shown in FIG. 10. In the following, a conventional digital interface for connecting a DV Format VCR with an outside equipment is described.

FIG. 11 is a block diagram of a conventional recording apparatus, which diagram shows the structure of a digital VCR using the 1394 digital interface. In FIG. 11, numeral 1 denotes an input terminal of the 1394 digital interface signal, 2 is a digital interface circuit (hereinafter referred to as digital I/F) for converting the 1394 Format data into bus data of certain specific units of audio data and video data (hereinafter referred to as DV bus data), 3 is a DV bus data, 4 is an error correction encoder for adding an error correction parity, 5 is a record modulator doing modulation, 6 is a record amplifier, 7 is a magnetic tape.

FIG. 12 is a block diagram of a conventional reproducing apparatus, which diagram shows the structure of a digital VCR using the 1394 digital interface. In FIG. 12, numeral 11 denotes a magnetic tape, 12 is a reproduction amplifier, 13 is a reproduction demodulator which performs equalizing, detecting and demodulating processes, 14 is an error correction decoder which performs error correction process based on an error correction parity added at recording, 15 is a DV bus data, 16 is a digital I/F which converts DV bus data into the 1394 Format data, 17 is an output terminal of the 1394 digital interface signal.

A 1394 Format digital signal delivered to terminal 1 is converted by the digital I/F 2, and generates DV bus data 3. The error correction encoder 4 adds an error correction parity to the DV bus data 3, the record modulator 5 performs modulation process for recording, and the data is recorded in the magnetic tape 7 via record amplifier 6.

When reproducing a data recorded in magnetic tape 11, a reproduced data is delivered to reproduction demodulator 13 via reproduction amplifier 12. The reproduction demodulator 13 distinguishes the 0, 1 of the reproduced data, and demodulates the data which has been modulated for recording. The data demodulated by reproduction demodulator 13 is delivered to error correction decoder 14, the error correction decoder 14 corrects the correctable error based on an error correction parity added at recording, and outputs DV bus data 15. The digital I/F 16 converts the DV bus data 15 into the 1394 Format digital signal to be outputted from terminal 17.

In the DV Format, video signals are compressed by the unit of each respective frame, so audio data are controlled also by the unit of each respective frame. There are two kinds of methods specified in the format for controlling the number of samples within a frame; lock mode and unlock mode. The lock mode is a mode in which the number of samples within frame is controlled fixed. In the 525/60 system 48 KHz sampling, for example, the number of samples in one unit of 5 frames are controlled fixed, the 5-frame sequence, whereas in the 625 scanning line/50 field" (hereinafter referred to as 625/50 system) signal, the number of samples may be controlled fixed by the unit of each 1 respective frame, so no sequence is taken. The unlock mode is a mode in which the number of samples in one frame may take any number within a certain range. Further, in the DV Format, there are two kinds of sampling methods, depending on the broadcasting system, in the preprocessing for the video signal compression. In the 525/60 system, the video signal sampling is based on the 4:2:2 component signal of ITU-R Rec. 601, the colour difference signal undergoes a ½ band width restricting process in the horizontal direction and is decimated in the horizontal direction by each 1 pixel (4:1:1 sampling); whereas in the 625/50 system, the video signal sampling is likewise based on the 4:2:2 component signal, and the colour difference signal undergoes a ½ band width restricting process in the vertical direction and is decimated in the vertical direction by each 1 pixel (line) (4:2:0 sampling).

DVCPRO (trademark applied) Format is being proposed as a DV Format for professional and broadcasting application. The DVCPRO Format is described in the Technical Report of The Institute of Electronics Information and Communication Engineers (Professional-use ¼ inch Digital VCR Format DVCPRO", MR95-37, October 1995). In the DVCPRO Format for professional and broadcasting application, only the 48 KHz sampling lock mode is supported as the audio record format, and only the 4:1:1 sampling is supported as the video recording format.

However, when using the digital interface with a DVCPRO Format recording/reproducing apparatus, in which only the 48 KHz sampling lock mode is supported as the audio record format and only the 4:1:1 sampling is supported as the video record format, following drawbacks arise.

A first drawback is that an audio data sampled by other frequency such as 32 KHz, 44.1 KHz etc., or a 48 KHz unlock mode audio data can not be transmitted and recorded from a DV Format recording/reproducing apparatus via said digital interface.

A second drawback is that even between recording/reproducing apparatuses of the same DVCPRO Format an audio data can not be recorded with right sequence via said digital interface unless the audio data is locked at the 5-frame sequence at each of the respective recording/reproducing apparatuses.

A third drawback is that when reproducing a DV Format recording medium on a DVCPRO Format recording/reproducing apparatus an audio data other than 48 KHz sampling lock mode is outputted to said digital interface as the DVCPRO Format data.

A fourth drawback is that it is unable to transmit and record a 4:2:0 sampled video data from a recording/reproducing apparatus in which the data is recorded in DV Format via said digital interface.

A fifth drawback is that when reproducing a DV Format recording medium on a DVCPRO Format recording/reproducing apparatus a 4:2:0 sampled video data is outputted to said digital interface as the DVCPRO Format data.

Among the recording/reproducing apparatus such as digital VCR etc., the present invention enables, even in the cases in which different systems of audio sampling and video compression are used, to implement a recording apparatus which can record a data transmitted through the digital interface, a reproducing apparatus which can output a reproduced data through the digital interface, and a conversion apparatus which can convert and output a data transmitted through the digital interface.

DISCLOSURE OF THE INVENTION

In order to address the above described problem, a recording apparatus in accordance with a first application of the present invention separates audio data from a multiplexed data of video data and audio data transmitted through digital interface, the audio data is converted in its sampling frequency, and then multiplexed again with the video data which is delayed taking the delay in audio processing into consideration, for recording.

In a second invention, audio data is separated from a multiplexed data of video data and audio data transmitted through digital interface, mode of the inputted audio data is detected to switch the processing of sampling frequency conversion on the audio data, and then multiplexed again with the video data which is delayed taking the delay in audio processing into consideration, for recording.

In a third invention, audio data is separated from the video data and audio data reproduced from a recording medium, sampling frequency of the audio data is converted, and then multiplexed again with the video data which is delayed taking the delay in audio processing into consideration, for outputting it through digital interface.

In a fourth invention, video data is separated from a multiplexed data of video data and audio data transmitted through digital interface, the video data is converted in its sampling type, and then multiplexed again with the audio data which has undergone a certain specific processing, for recording.

In a fifth invention, video data is separated from a multiplexed data of video data and audio data transmitted through digital interface, mode of the inputted video data is detected to switch the processing of sampling type conversion for processing of the video data, and then multiplexed again with the audio data which has undergone a certain specific processing, for recording.

In a sixth invention, video data is separated from a video data and audio data reproduced from a recording medium, sampling type of the video data is converted, and then multiplexed again with the audio data which has undergone a certain specific processing, for outputting it through digital interface.

With the above described constitution, a transmitted data may be recorded, and a reproduced data may be outputted using digital interface.

BEST MODE FOR CARRYING OUT THE INVENTION

Figure 1:
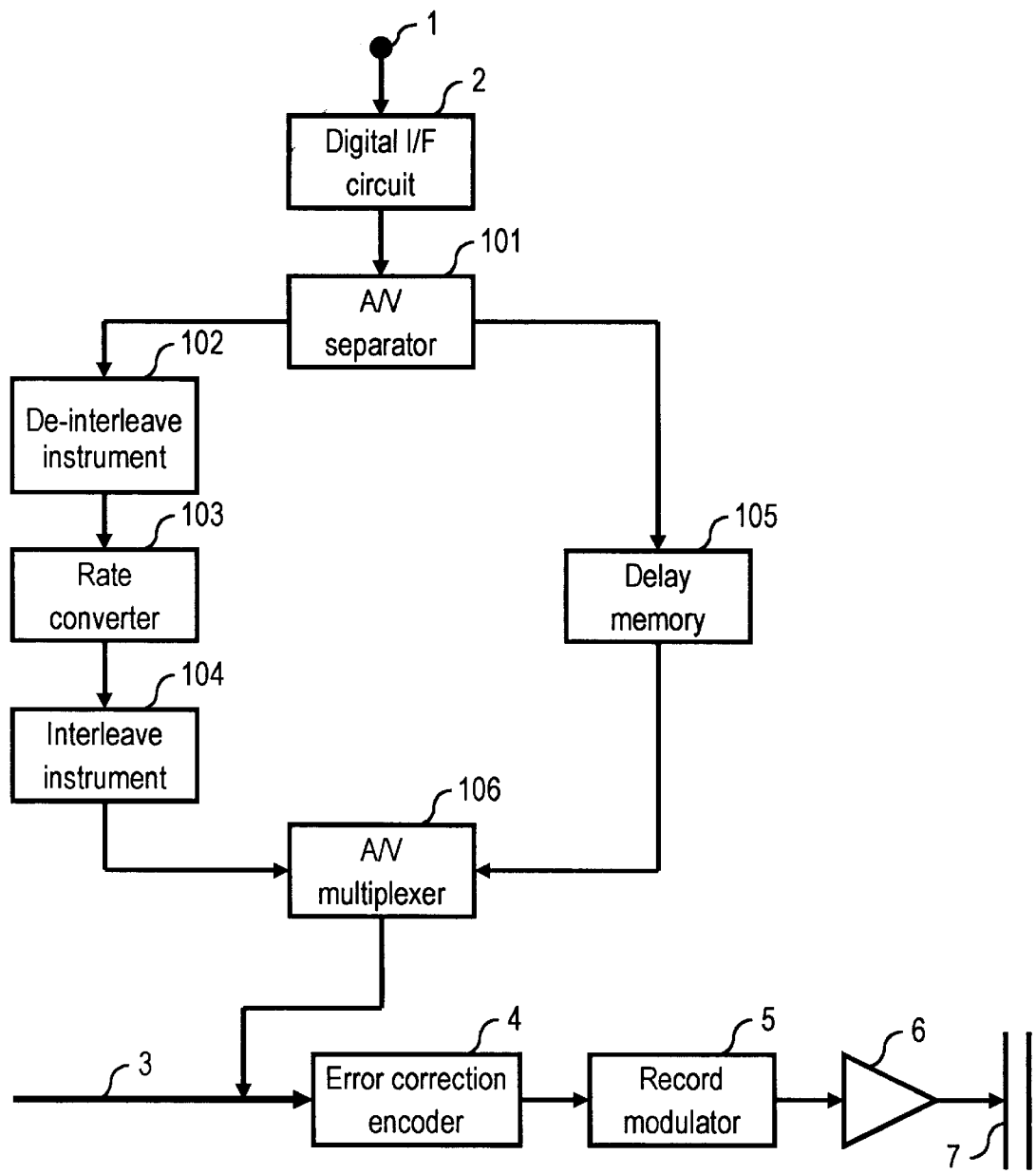
FIG. 1 is a block diagram showing the constitution of a recording apparatus in accordance with a first exemplary embodiment of the present invention.

A first invention of the present application comprises a connecting means for connecting a signal transmitted from an external apparatus through digital interface after converting into data of certain specific units, a separating means for separating the data of certain specific units converted at said connecting means into interleaved audio data and video data, a data reverse-converting means for de-interleaving an audio data separated at said separating means and interleaved, a rate converting means for converting in the sampling frequency of the audio data which has been converted by said data reverse-converting means to the original arrangement, a data converting means for interleaving the audio data converted in its sampling frequency at said rate converting means, a delay means for delaying the video data separated by said separating means, a multiplexing means for multiplexing the audio data interleaved at said data converting means and the video data delayed at said delay means to make up a data consisted of the unit of blocks, and a recording means for recording the data multiplexed at said multiplexing means on a recording medium. With the above described structure, various audio data of different sampling frequencies may be inputted for recording through digital interface.

A second invention comprises a connecting means for connecting a signal transmitted from an external apparatus through digital interface after converting into data of certain specific units, a separating means for separating the data of certain specific units converted at said connecting means into interleaved audio data and video data, an audio mode detecting means for detecting the mode of audio data separated at said separating means, a data reverse-converting means for reverse-converting an audio data separated at said separating means and interleaved, a rate converting means for converting in the sampling frequency of the audio data which has been converted by said data reverse-converting means to the original arrangement, a selecting means for selecting either an audio data converted in its sampling frequency at said rate converting means or an audio data de-interleaved at said data reverse-converting means in accordance with results of detection at said audio mode detecting means, a data converting means for interleaving the audio data selected at said selecting means, a delay means for delaying the video data separated at said separating means, a multiplexing means for multiplexing the audio data interleaved at said data converting means and the video data delayed at said delay means to make up a data of certain specific units, and a recording means for recording the data multiplexed at said multiplexing means on a recording medium. With the above described structure, various audio data of different sampling frequencies may be inputted for recording through digital interface, or those of the same sampling frequency may be recorded locked to the video frame sequence.

A third invention comprises a reproducing means for reproducing data from a recording medium, a separating means for separating the data reproduced by said reproducing means into interleaved audio data and video data, an audio mode detecting means for detecting the mode of audio data separated at said separating means, a data reverse-converting means for de-interleaving an audio data separated at said separating means and interleaved, a rate converting means for converting in the sampling frequency of the audio data which has been converted by said data reverse-converting means to the original arrangement, a selecting means for selecting an audio data among the one converted in its sampling frequency at said rate converting means and the one de-interleaved at said data reverse-converting means in accordance with the result of detection at said audio mode detecting means, a data converting means for interleaving the audio data selected at said selecting means, a delay means for delaying the video data separated at said separating means, a multiplexing means for multiplexing the audio data interleaved at said data converting means and the video data delayed at said delay means to make up a data consisted of certain specific units, and an outputting means for outputting a multiplexed data of certain specific units comprised of the audio data and the video data to digital interface.

With the above described structure, an audio data having sampling frequency locked to video may be outputted to digital interface irrespective of sampling frequency of the reproduced audio data.

A fourth invention comprises a connecting means for connecting a signal transmitted from an external apparatus through digital interface after converting into data of certain specific units, a separating means for separating the data of certain specific units converted at said connecting means into interleaved audio data and high-efficiency encoded video data, a data reverse-converting means for de-interleaving the audio data separated at said separating means and interleaved, a rate converting means for converting in the sampling frequency of the audio data which has been converted by said data reverse-converting means to the original arrangement, a data converting means for interleaving the audio data converted in its sampling frequency at said rate converting means, a video mode detecting means for detecting the mode of video data separated at said separating means, a high-efficiency decoding means for high-efficiency decoding the high-efficiency encoded video data separated at said separating means, a sampling type converting means for converting the sampling type of video data, a high-efficiency encoding means for high-efficiency encoding the video data converted in its sampling type at said sampling type converting means, a delay means for delaying the high-efficiency encoded video data separated at said separating means, a selecting means for selecting a video data among the one which is high-efficiency encoded by said high-efficiency encoding means and the one which is delayed at said delay means in accordance with the result of detection at said video mode detecting means, a multiplexing means for multiplexing the audio data interleaved at said data converting means and the video data selected at said selecting means to make up a data of certain specific units, and a recording means for recording the data multiplexed at said multiplexing means on a recording medium. With the above described structure, various video data of different sampling types may be inputted for recording through digital interface.

A fifth invention comprises a connecting means for connecting a signal transmitted from an external apparatus through digital interface after converting into data of certain specific units, a separating means for separating the data of certain specific units converted at said connecting means into interleaved audio data and high-efficiency encoded video data, an audio mode detecting means for detecting the mode of audio data separated at said separating means, a data reverse-converting means for de-interleaving the audio data separated at said separating means and interleaved, a rate converting means for converting in the sampling frequency of the audio data which has been converted by said data reverse-converting means to original arrangement, a data converting means for interleaving the audio data converted in its sampling frequency at said rate converting means, a first delay means for delaying the audio data separated at said separating means and interleaved, a first selecting means for selecting an audio data among the one which is interleaved at said data converting means and the one which is delayed at said first delay means in accordance with the result of detection by said audio mode detecting means, a video mode detecting means for detecting the mode of video data separated at said separating means, a high-efficiency decoding means for high-efficiency decoding the high-efficiency encoded video data separated at said separating means, a sampling type converting means for converting the sampling type of video data, a high-efficiency encoding means for high-efficiency encoding the video data converted in its sampling type at said sampling type converting means, a second delay means for delaying the high-efficiency encoded video data separated at said separating means, a second selecting means for selecting a video data among the one which is high-efficiency encoded at said high-efficiency encoding means and the one which is delayed at said second delay means in accordance with the result of detectionby said video mode detecting means, a multiplexing means for multiplexing the audio data selected at said first selecting means and the video data selected at said second selecting means to makeup a data of certain specific units, and a recording means for recording the data multiplexed at said multiplexing means on a recording medium. With the above described structure, various audio data of different sampling frequencies and various video data of different sampling types may be inputted for recording through digital interface.

A sixth invention comprises a reproducing means for reproducing data from a recording medium, a separating means for separating the data reproduced by said reproducing means into interleaved audio data and high-efficiency encoded video data, an audio mode detecting means for detecting the mode of audio data separated at said separating means, a data reverse-converting means for de-interleaving an audio data separated at said separating means and interleaved, a rate converting means for converting in the sampling frequency of the audio data which has been converted by said data reverse-converting means to the original arrangement, a data converting means for interleaving the audio data converted in its sampling frequency at said rate converting means, a first delay means for delaying the audio data separated at said separating means and interleaved, a first selecting means for selecting an audio data among the one which is interleaved at said data converting means and the one which is delayed at said second delay means in accordance with the result of detection by said audio mode detecting means, a video mode detecting means for detecting the mode of video data separated at said separating means, a high-efficiency decoding means for high-efficiency decoding the high-efficiency encoded video data separated at said separating means, a sampling type converting means for converting the type of sampling of video data, a high-efficiency encoding means for high-efficiency encoding the video data converted in its sampling type at said sampling type converting means, a second delay means for delaying the high-efficiency encoded video data separated at said separating means, a second selecting means for selecting a video data among the one which is high-efficiency encoded at said high-efficiency encoding means and the one which is delayed at said second delay means in accordance with the result of detectionby said video mode detecting means, a multiplexing means for multiplexing the audio data selected at said first selecting means and the video data selected at said second selecting means to make up a data consisted of certain specific units, and an outputting means for outputting the audio data and video data of certain specific units multiplexed at said multiplexing means to digital interface. With the above described structure, an audio data having sampling frequency locked to video may be outputted to digital interface irrespective of sampling frequency of the reproduced audio data and a video data of certain specific sampling type may be outputted to digital interface irrespective of the sampling type of reproduced video data.

Now in the following, exemplary embodiments of the present invention are described referring to drawings.

(Embodiment 1)

FIG. 1 is a block diagram showing the structure of a recording apparatus in accordance with a first exemplary embodiment of the present invention. Those constituent elements similar to those in the conventional are represented by using similar symbols, and description of which are omitted. In FIG. 1, numeral 101 denotes an A/V separator functioning as separating means for separating audio data and video data, 102 is a de-interleave instrument functioning as data reverse-converting means for de-interleaving interleaved audio data, 103 is a rate converter functioning as rate converting means, 104 is an interleave instrument functioning as data converting means for interleaving audio data, 105 is a delay memory functioning as video data delay means, 106 is an A/V multiplexer functioning as multiplexing means for multiplexing audio data and video data.

Operation of the recording apparatus is described in the following.

A 1394 Format digital signal delivered to terminal 1 is converted into the DV bus data 3 type by digital I/F circuit 2 to be inputted in A/V separator 101. In the A/V separator 101, the inputted data is separated to audio data and video data. Among the data separated at A/V separator 101, audio data is inputted to de-interleave instrument 102. The audio data inputted in de-interleave instrument 102 has been interleaved, therefore it undergoes de-interleave processing at de-interleave instrument 102, and then inputted in rate converter 103. In the rate converter 103, the inputted audio data is converted into 48 KHz sampling audio data synchronized with video sampling frequency to be inputted in interleave instrument 104. In the interleave instrument 104, the inputted audio data undergoes the processing of 5-frame sequence and interleave, and then inputted in A/V multiplexer 106. On the other hand, video data, among the data separated at A/V separator 101, is inputted in delay memory 105. The delay memory 105 delays the video data taking the above described series of processing delays in audio data into consideration, and then the data is inputted in A/V multiplexer 106. In the A/V multiplexer 106, the inputted audio data and video data are multiplexed to output DV bus data 3. Error correction encoder 4 adds an error correction parity to the inputted DV bus data 3, record modulator 5 modulates it for recording, and the data is recorded on a magnetic tape 7 via record amplifier 6.

Figure 2:
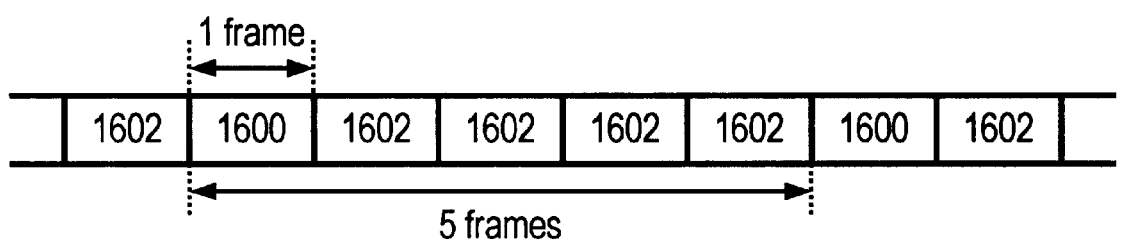
FIG. 2 is a chart used to explain the control on the number of samples in audio data.

The control on the number of samples with the audio data is described in the following. In a digital VCR for broadcasting or professional application or other such appliance, the sampling frequency of audio data needs to be in synchronization with the sampling frequency of video data. Namely, the number of samples for each 1 field or 1 frame needs to be fixed. The sample number control on audio data in the DVCPRO Format is as follows. The sampling frequency of audio data is 48 KHz; when recording a 525/60 system, there are 29.97 frames per 1 second, so the sample counts for 1 frame period is 1601.6 samples. The total of five frames makes 8008 samples; therefore, as shown in FIG. 2, in one sequence of 5 frames, each of the first 4 frames records 1602 samples, and the last 1 frame records 1600 samples. This is called lock mode. In the DV Format which is for a consumer-use digital VCR, there exists, besides the lock mode, unlock mode, where the sample counts for 1 frame period being free within certain range. In this case, the sampling frequency of audio data is not synchronized with the sampling frequency of video data; in the DV Format, when sampling frequency of audio data is 48 KHz, the sample number control on audio data allows to take any sample counts between 1580 samples and 1620 samples for 1 frame period with the 525/60 system.

In the present recording apparatus, a signal delivered through the 1394 digital interface undergoes a rate conversion, regardless of whether audio data has lock mode or unlock mode, and even in unlock mode, regardless of the sampling frequency of audio data, to be synchronized with the sampling frequency of video for the 5-frame sequence processing.

As described in the above, in the exemplary Embodiment 1, an audio data of lock mode or unlock mode sampled at any frequency comming through the 1394 digital interface is converted into 48 KHz sampling lock mode, and may be recorded with the 5-frame sequence control.

With Embodiment 1, it is also possible to implement a conversion apparatus by transmitting the DV bus data outputted from A/V multiplexer 106 to any external apparatus using digital I/F circuit 16, which conversion apparatus being able to convert an audio data of lock mode or unlock mode sampled at any frequency comming through the 1394 digital interface into the 48 KHz sampling lock mode, at the same time controlled in the 5-frame sequence, and transmit it to the 1394 digital interface.

Although the 1394 digital interface is used as the signal input/output section in Embodiment 1, any other interface may of course be used for the same purpose.

(Embodiment 2)

Figure 3:
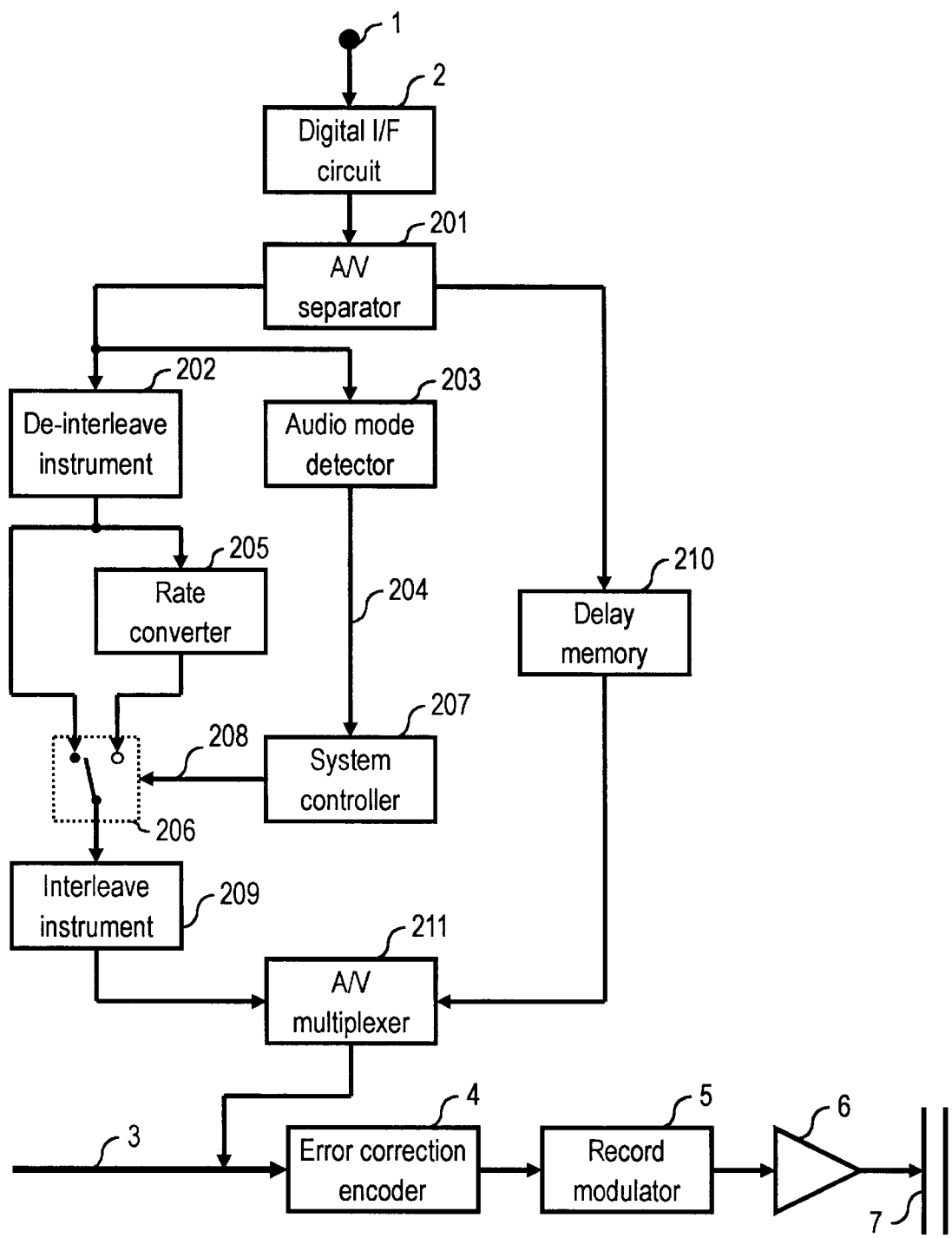
FIG. 3 is a block diagram showing the constitution of a recording apparatus in accordance with a second exemplary embodiment of the present invention.

FIG. 3 is a block diagram showing the structure of a recording apparatus in accordance with a second exemplary embodiment of the present invention. Those constituent elements similar to those in the conventional are represented by using similar symbols, and description of which are omitted. In FIG. 3, numeral 201 denotes an A/V separator functioning as separating means for separating audio data and video data, 202 is a de-interleave instrument functioning as data reverse-converting means for de-interleaving interleaved audio data, 203 is an audio mode detector functioning as audio mode detecting means for detecting the mode of an audio data separated at A/V separator 201, 204 is a mode information detected by audio mode detector 203, 205 is a rate converter functioning as rate converting means, 206 is a switch functioning as selecting means, 207 is a system controller for controlling the operation of the present recording apparatus, 208 is a control signal for switching the switch 206, 209 is an interleave instrument functioning as data converting means for interleaving data, 210 is a delay memory functioning as video data delay means, 211 is an A/V multiplexer functioning as multiplexing means for multiplexing audio data and video data.

Operation of the above recording apparatus is described in the following.

A 1394 Format digital signal delivered to terminal 1 is converted into the DV bus data 3 type at digital I/F circuit 2 to be inputted in A/V separator 201. In the A/V separator 201, the inputted data is separated to audio data and video data. Among the data separated at A/V separator 201, audio data is inputted to de-interleave instrument 202, and the mode of audio data is detected by audio mode detector 203. The audio data inputted in de-interleave instrument 202 has been interleaved, therefore it undergoes de-interleave processing at de-interleave instrument 202, and then inputted in rate converter 205, also in switch 206, respectively. In the rate converter 205, the inputted audio data is converted into 48 KHz sampling audio data synchronized with video sampling frequency to be delivered to switch 206. The switch 206 selects an audio data in accordance with the control signal 208 established at system controller 207 based on mode information 204 detected by audio mode detector 203. The audio data selected at switch 206 is inputted in interleave instrument 209, the interleave instrument 209 applies the processing of 5-frame sequence and interleave on the inputted audio data, and the data is delivered to A/V multiplexer 211. On the other hand, video data, among the data separated at A/V separator 201, is inputted in delay memory 210. The delay memory 210 delays the video data taking the above described series of processing delays with audio data into consideration, and then the data is inputted in A/V multiplexer 211. In the A/V multiplexer 211, the inputted audio data and video data are multiplexed to output the DV bus data 3. Error correction encoder 4 adds an error correction parity to the inputted DV bus data 3, record modulator 5 modulates for recording, and the data is recorded on a magnetic tape 7 via record amplifier 6.

In the present recording apparatus, an audio data delivered from the 1394 digital interface is judged by mode detector 203 whether the audio data has lock mode or unlock mode. If it is unlock mode, the rate conversion is applied regardless of the sampling frequency of audio data to be synchronized with the sampling frequency of video for the 5-frame sequence processing. If it is lock mode, the sampling frequency of audio data has been synchronized with the sampling frequency of video, therefore there is no need of rate conversion, so it goes straight to interleave instrument 209 for the 5-frame sequence processing. As described above, although the scale of circuit goes larger than in Embodiment 1, there is no deterioration of audio data, because no rate conversion is applied at lock mode, the audio sample data remaining as the original sample data.

As described in the above, in the exemplary Embodiment 2, the mode of an audio data inputted through the 1394 digital interface is detected, if the audio data has unlock mode sampled at any desired frequency, or the 48 KHz sampling lock mode, it may be recorded in 48 KHz sampling lock mode with 5-frame sequence.

With Embodiment 2, it is also possible to implement a conversion apparatus by transmitting the DV bus data outputted from A/V multiplexer 211 to any external apparatus using digital I/F circuit 16, which conversion apparatus being capable of detecting the mode of an audio data comming through the 1394 digital interface, if the audio data has unlock mode sampled at any desired frequency, or 48 KHz sampling lock mode, converting it in 48 KHz sampling lock mode with 5-frame sequence to be transmitted to the 1394 digital interface.

Although the 1394 digital interface is used as the signal input/output section in Embodiment 2, any other interface may of course be used for the same purpose.

(Embodiment 3)

Figure 4:
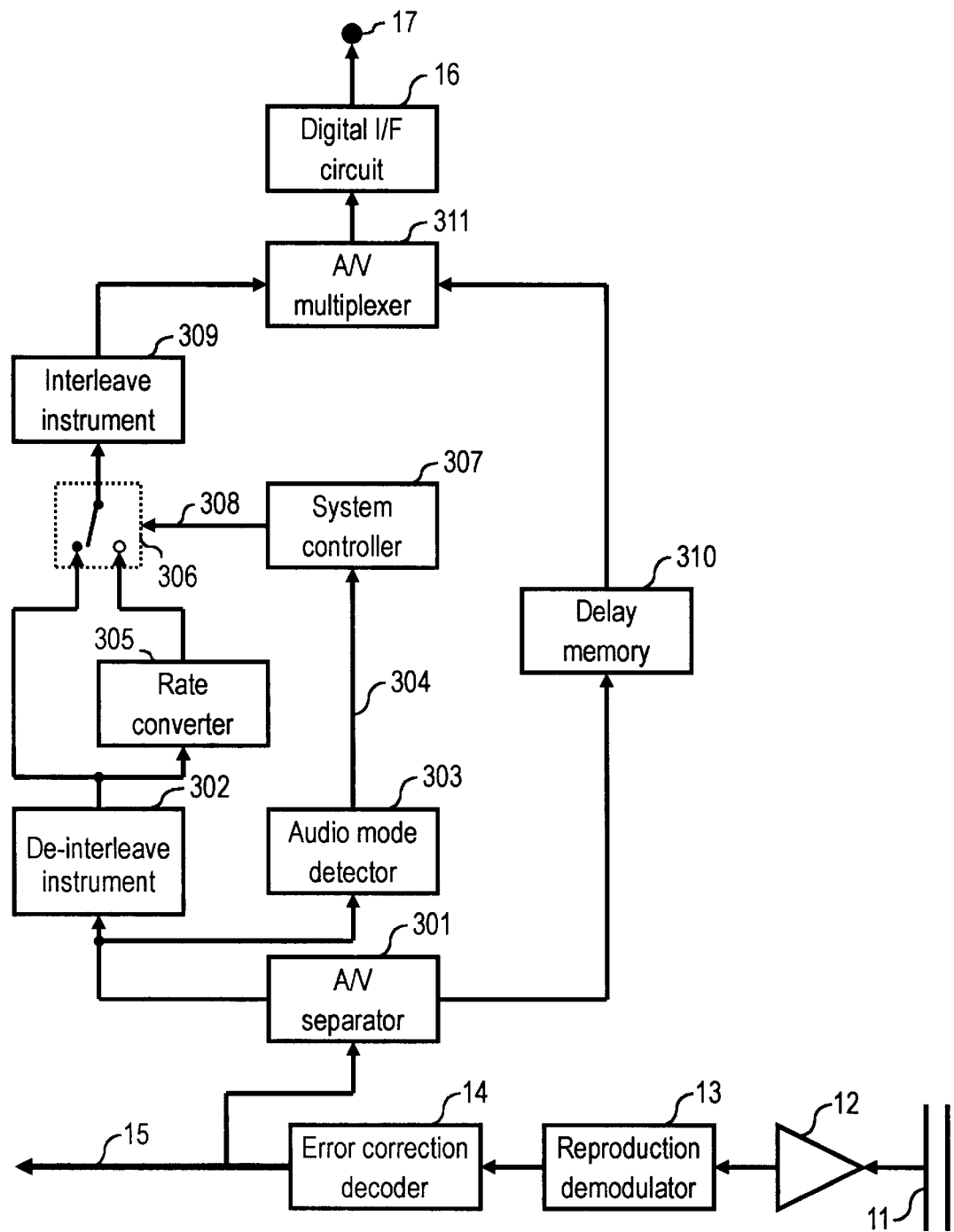
FIG. 4 is a block diagram showing the constitution of a reproducing apparatus in accordance with a third exemplary embodiment of the present invention.

FIG. 4 is a block diagram showing the structure of a reproducing apparatus in accordance with a third exemplary embodiment of the present invention. Those constituent elements similar to those in the conventional are represented by using similar symbols, and description of which are omitted. In FIG. 4, numeral 301 denotes an A/V separator functioning as separating means for separating audio data and video data, 302 is a de-interleave instrument functioning as data reverse-converting means for de-interleaving interleaved audio data, 303 is an audio mode detector functioning as audio mode detecting means for detecting the mode of an audio data separated at A/V separator 301, 304 is a mode information detected by audio mode detector 303, 305 is a rate converter functioning as rate converting means, 306 is a switch functioning as selecting means, 307 is a system controller for controlling the operation of the present reproducing apparatus, 308 is a control signal for switching the switch 306, 309 is an interleave instrument functioning as data converting means for interleaving audio data, 310 is a delay memory functioning as video data delay means, 311 is an A/V multiplexer functioning as multiplexing means for multiplexing audio data and video data.

Operation of the above reproducing apparatus is described in the following.

When reproducing a data recorded in magnetic tape 11, the reproduced data is delivered to a reproduction demodulator 13 via reproduction amplifier 12. In the reproduction demodulator 13, the reproduced data undergoes the 0, 1 judgment, and the data that has been modulated for recording is demodulated. The data demodulated at reproduction demodulator 13 is delivered to an error correction decoder 14, the error correction decoder 14 corrects the correctable errors based on an error correction parity added at recording, and the data is outputted in the form of DV bus data 15. In the A/V separator 301, inputted DV bus data 15 is separated to audio data and video data. Among the data separated at A/V separator 301, audio data is inputted to de-interleave instrument 302, and the mode of audio data is detected by audio mode detector 303. The audio data inputted in de-interleave instrument 302 has been interleaved, therefore it undergoes de-interleave processing at de-interleave instrument 302, and then inputted in rate converter 305, also in switch 306, respectively. In rate converter 305, the inputted audio data is converted into 48 KHz sampling audio data synchronized with video sampling frequency to be delivered to switch 306. The switch 306 selects an audio data in accordance with the control signal 308 established at system controller 307 based on mode information 304 detected by audio mode detector 303. The audio data selected at switch 306 is inputted to interleave instrument 309, the interleave instrument 309 applies the processing of 5-frame sequence and interleave on the inputted audio data, and is delivered to A/V multiplexer 311. On the other hand, video data, among the data separated at A/V separator 301, is inputted in delay memory 310. The delay memory 310 delays the video data taking the above described series of processing delays of audio data into consideration, and then the data is inputted in A/V multiplexer 311. In the A/V multiplexer 311, the inputted audio data and video data are multiplexed to be outputted in the form of DV bus data 15 type to digital I/F circuit 16. The digital I/F circuit 16 converts the DV bus data 15 type signal into the 1394 Format digital signal, and outputs it through terminal 17.

In the present reproducing apparatus, an audio data reproduced from a recording medium is judged by the audio mode detector 303 whether the audio data has lock mode or unlock mode. If it is unlock mode, the rate conversion is applied regardless of the sampling frequency of audio data to be synchronized with the sampling frequency of video for the 5-frame sequence processing. If it is lock mode, the sampling frequency of audio data has been synchronized with the sampling frequency of video, therefore there is no need of rate conversion, so it goes straight to interleave instrument 309 for the 5-frame sequence processing.

As described in the above, in the exemplary Embodiment 3, the mode of an audio data reproduced from a recording medium is detected, if the audio data has unlock mode sampled at any desired frequency, or the 48 KHz sampling lock mode, the data may be outputted to the 1394 digital interface in 48 KHz sampling lock mode with 5-frame sequence.

Although the 1394 digital interface is used as the signal output section in Embodiment 3, any other interface may of course be used for the same purpose.

(Embodiment 4)

Figure 5:
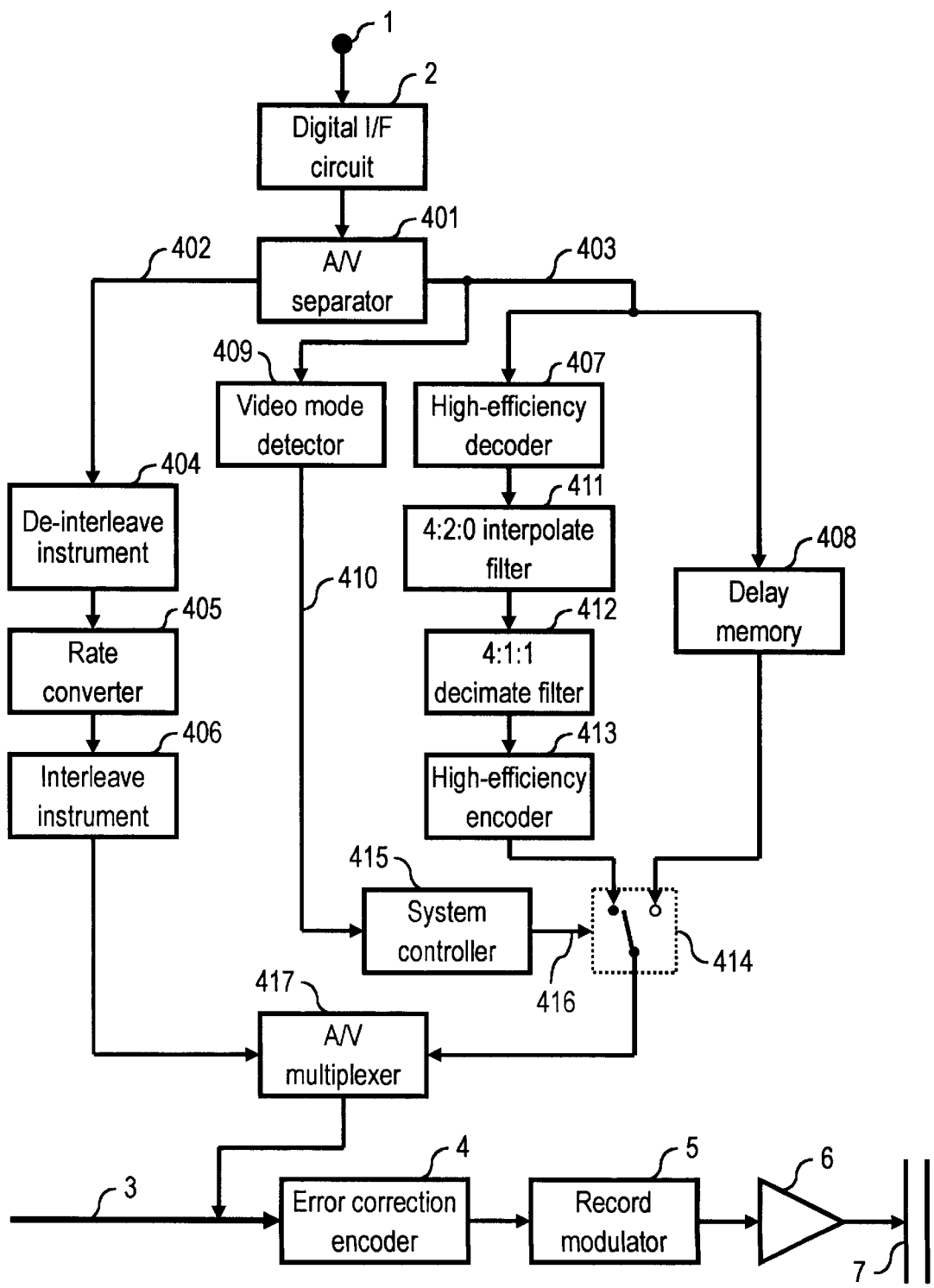
FIG. 5 is a block diagram showing the constitution of a recording apparatus in accordance with a fourth exemplary embodiment of the present invention.

FIG. 5 is a block diagram showing the structure of a recording apparatus in accordance with a fourth exemplary embodiment of the present invention. Those constituent elements similar to those in the conventional are represented by using similar symbols, and description of which are omitted. In FIG. 5, numeral 401 denotes an A/V separator functioning as separating means for separating audio data and video data, 402 is an interleaved audio data, 403 is a high-efficiency encoded video data, 404 is a de-interleave instrument functioning as data reverse-converting means for de-interleaving interleaved audio data, 405 is a rate converter functioning as rate converting means, 406 is an interleave instrument functioning as data converting means for interleaving audio data, 407 is a high-efficiency decoder functioning as high-efficiency decoding means for high-efficiency decoding the high-efficiency encoded video data 403, 408 is a delay memory functioning as video data delay means, 409 is a video mode detector functioning as video mode detecting means for detecting the mode of video data 403 separated at A/V separator 401, 410 is a mode information detected by video mode detector 409, 411 is a 4:2:0 interpolate filter functioning as data interpolating means for interpolating the pixel of colour difference signal of the 4:2:0 sampled video data and converting it to the 4:2:2 sampling, 412 is a 4:1:1 decimate filter functioning as data decimating means for converting colour difference signal of the 4:2:2 sampled video data, after applying a ½ band width restricting process in horizontal direction, into a 4:1:1 sampling by decimating every 1 pixel in horizontal direction, 413 is a high-efficiency encoder functioning as high-efficiency encoding means for high-efficiency encoding the 4:1:1 sampled video data, 414 is a switch functioning as selecting means, 415 is a system controller for controlling the operation of the present recording apparatus, 416 is a control signal for switching the switch 414, 417 is an A/V multiplexer functioning as multiplexing means for multiplexing audio data and video data.

Operation of the above recording apparatus is described in the following.

A 1394 Format digital signal inputted to terminal 1 is converted into the DV bus data 3 type by digital I/F circuit 2 to be inputted in A/V separator 401. In the A/V separator 401, the inputted data is separated to audio data 402 and video data 403. Among the data separated at A/V separator 401, audio data 402 is inputted to de-interleave instrument 404. The audio data inputted in de-interleave instrument 404 has been interleaved, therefore it undergoes de-interleave processing at de-interleave instrument 404, and then inputted in rate converter 405. In the rate converter 405, the inputted audio data is converted into 48 KHz sampling audio data synchronized with video sampling frequency to be inputted to interleave instrument 406. In the interleave instrument 406, the inputted audio data undergoes interleave processing to be inputted in A/V multiplexer 417. On the other hand, video data 403, among the data separated at A/V separator 401, is inputted in high-efficiency decoder 407 and delay memory 408, at the same time a video mode detector 409 detects the mode of video data 403. The video data 403 inputted in high-efficiency decoder 407 is a high-efficiency encoded data, so it is decoded by high-efficiency decoder 407 and then inputted in the 4:2:0 interpolate filter 411. In the 4:2:0 interpolate filter 411, the 4:2:0 sampling data is interpolated by 4:2:2 sampling data and then inputted in 4:1:1 decimate filter 412. In the 4:1:1 decimate filter 412, the 4:2:2 sampling data undergoes a ½ band width restricting process and then the data is decimated to make 4:1:1 sampling to be inputted in high-efficiency encoder 413. The 4:1:1 sampling video data inputted in the high-efficiency encoder 413 is high-efficiency encoded and delivered to switch 414. The video data 403 inputted in delay memory 408 is delayed taking the above described series of processing delays of video data into consideration, and then delivered to switch 414. The switch 414 selects a video data in accordance with a control signal 416 established by system controller 415 based on mode information 410 detected by video mode detector 409. The video data selected by switch 414 is inputted in A/V multiplexer 417. In the A/V multiplexer 417, the inputted audio data and video data are multiplexed to output the DV bus data 3. Error correction encoder 4 adds an error correction parity on the inputted DV bus data 3, record modulator 5 modulates for recording, and the data is recorded on a magnetic tape 7 via record amplifier 6.

Figure 6:
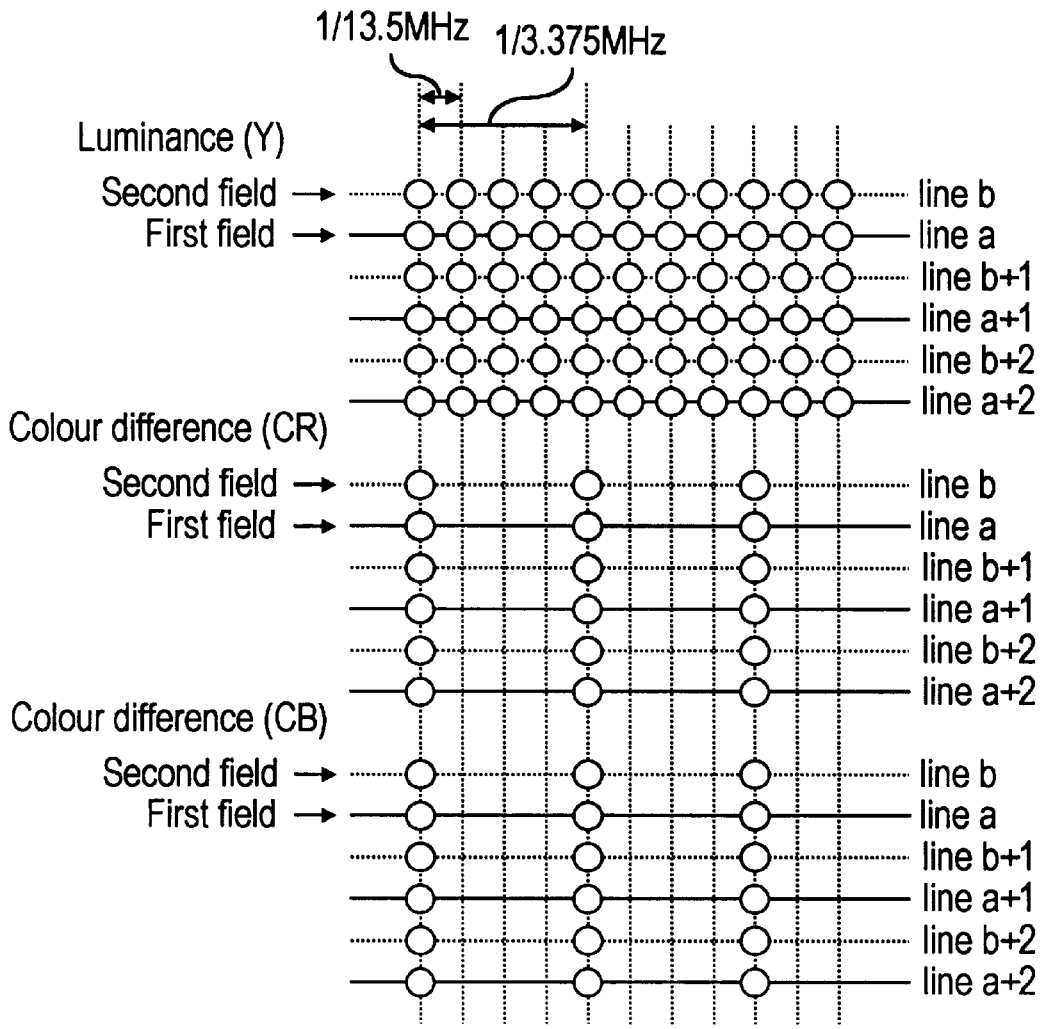
FIG. 6 is a chart used to explain the 4:1:1 sampling.
Figure 7:
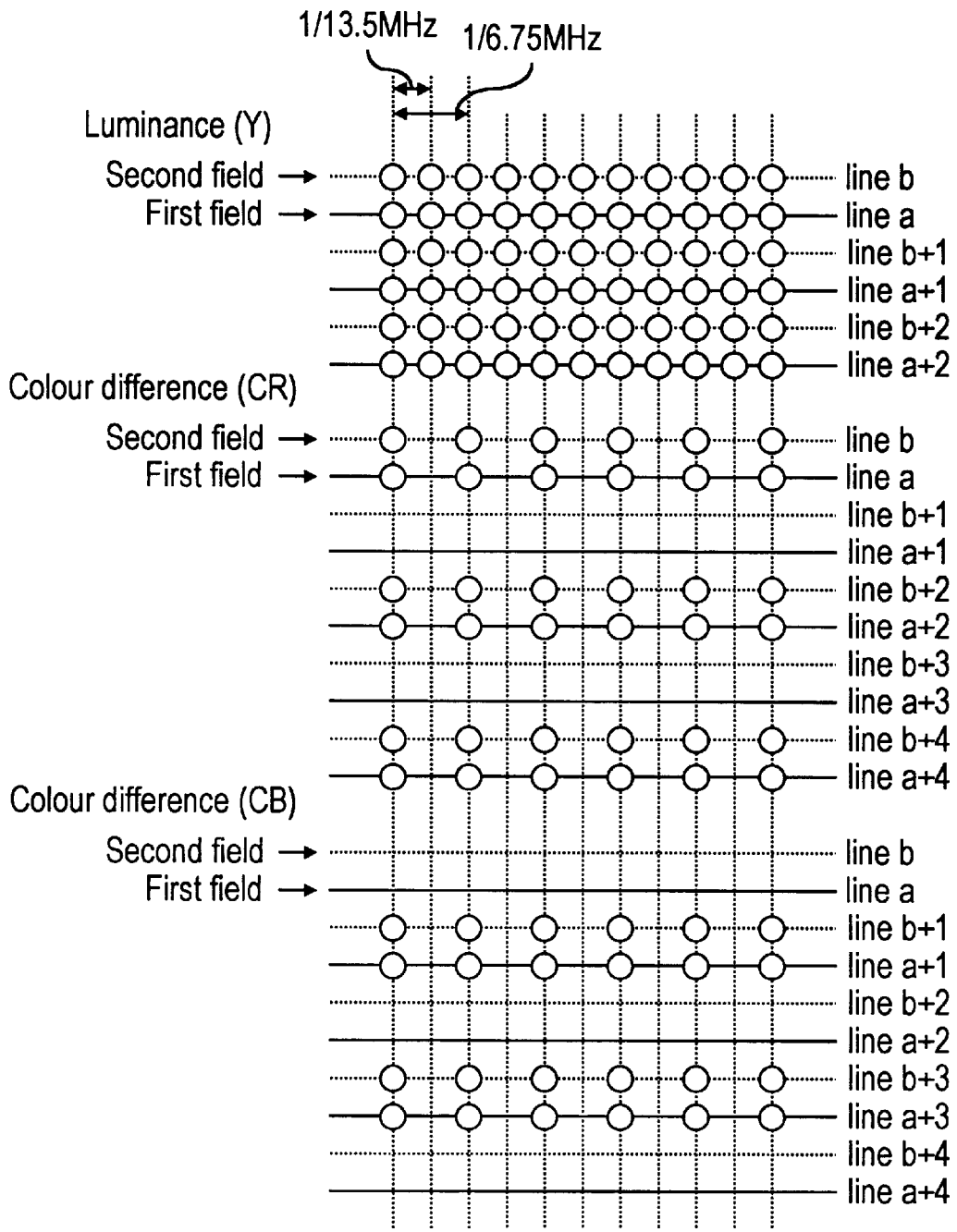
FIG. 7 is a chart used to explain the 4:2:0 sampling.

Now in the following, the original sampling before the high-efficiency encoding of video data is described. In a digital VCR or such other apparatus in which the video signal is compressed for recording, the sampling frequency is dropped before compression to decrease the quantity of data before the compression, in order to make the distortion due to compression as small as possible. There are two representative kinds of sampling methods for the preprocessing of video signal compression. FIG. 6 shows a first one, where, the 4:2:2 component signal based on ITU-R Rec.601 is used as the base, the colour difference signal undergoes a ½ band width restriction process in horizontal direction and then decimated every 1 pixel in horizontal direction (4:1:1 sampling). FIG. 7 shows the other one, where, the 4:2:2 component signal is likewise used as the base, the colour difference signal undergoes a ½ band width restriction process in vertical direction and then decimated every 1 pixel (line) in vertical direction (4:2:0 sampling). The method of restricting the band width of video data in the DVCPRO Format is the 4:1:1 sampling. In the DV Format, however, the method of restricting the band width of video data is the 4:1:1 sampling for 525/60 system, the 4:2:0 sampling for 625/50 system.

In the present recording apparatus, a signal inputted from 1394 digital interface undergoes a rate conversion, regardless of whether audio data has lock mode or unlock mode, and even when it is unlock mode, regardless of the sampling frequency of audio data, to be synchronized with the sampling frequency of video. The video data inputted through the 1394 digital interface is judged by video mode detector 409 whether the video data is the 625/50 system 4:2:0 sampling or the 625/50 system 4:1:1 sampling. If it is 625/50 system 4:2:0 sampling, the video data undergoes the high-efficiency encoding, the data compensation and the data decimating for the 4:1:1 sampling high-efficiency encoding process. If it is 625/50 system 4:1:1 sampling, the 4:1:1 sampling high-efficiency encoding process is already finished, therefore no more such processing is applied (video data of the delay memory 408 is selected by switch 414).

As described in the above, in the exemplary Embodiment 4, an audio data of lock mode or unlock mode sampled at any frequency comming through 1394 digital interface may be recorded converted in 48 KHz sampling lock mode. After detecting the mode of video data inputted through 1394 digital interface, if the video data is of 4:2:0 sampling it may be recorded with 4:1:1 sampling.

With Embodiment 4, it is also possible to implement a recording apparatus by inputting an audio data 402, after applying certain specific delay processing thereon, in the A/V multiplexer 417, in which recording apparatus no conversion process being applied on audio data inputted through 1394 digital interface, while only video data undergoes the mode detection, in a case when the video data is of 4:2:0 sampling it is recorded with 4:1:1 sampling.

Further with Embodiment 4, it is also possible to implement a converting apparatus by transmitting DV bus data outputted from A/V multiplexer 417 to any external apparatus using digital I/F circuit 16, which converting apparatus being capable of converting an audio data, lock mode or unlock mode, sampled at any frequency comming through 1394 digital interface, into 48 KHz sampling lock mode to be transmitted to 1394 digital interface, while video data inputted through 1394 digital interface undergoes mode detection, in a case when the video data is of 4:2:0 sampling it may be transmitted to 1394 digital interface with 4:1:1 sampling.

Furthermore, with Embodiment 4, it is also possible to implement a converting apparatus by inputting audio data 402 direct to A/V multiplexer 417 and transmitting DV bus data outputted from A/V multiplexer 417 to any external apparatus using digital I/F circuit 16, in which converting apparatus an audio data, lock mode or unlock mode, sampled at any frequency comming through 1394 digital interface, being converted into 48 KHz sampling lock mode to be transmitted to 1394 digital interface, while video data inputted through 1394 digital interface undergoes mode detection, in a case when the video data is of 4:2:0 sampling it may be transmitted to 1394 digital interface with 4:1:1 sampling.

Although the 1394 digital interface is used as the signal input/output section in Embodiment 4, any other interface may of course be used for the same purpose.

(Embodiment 5)

Figure 8:
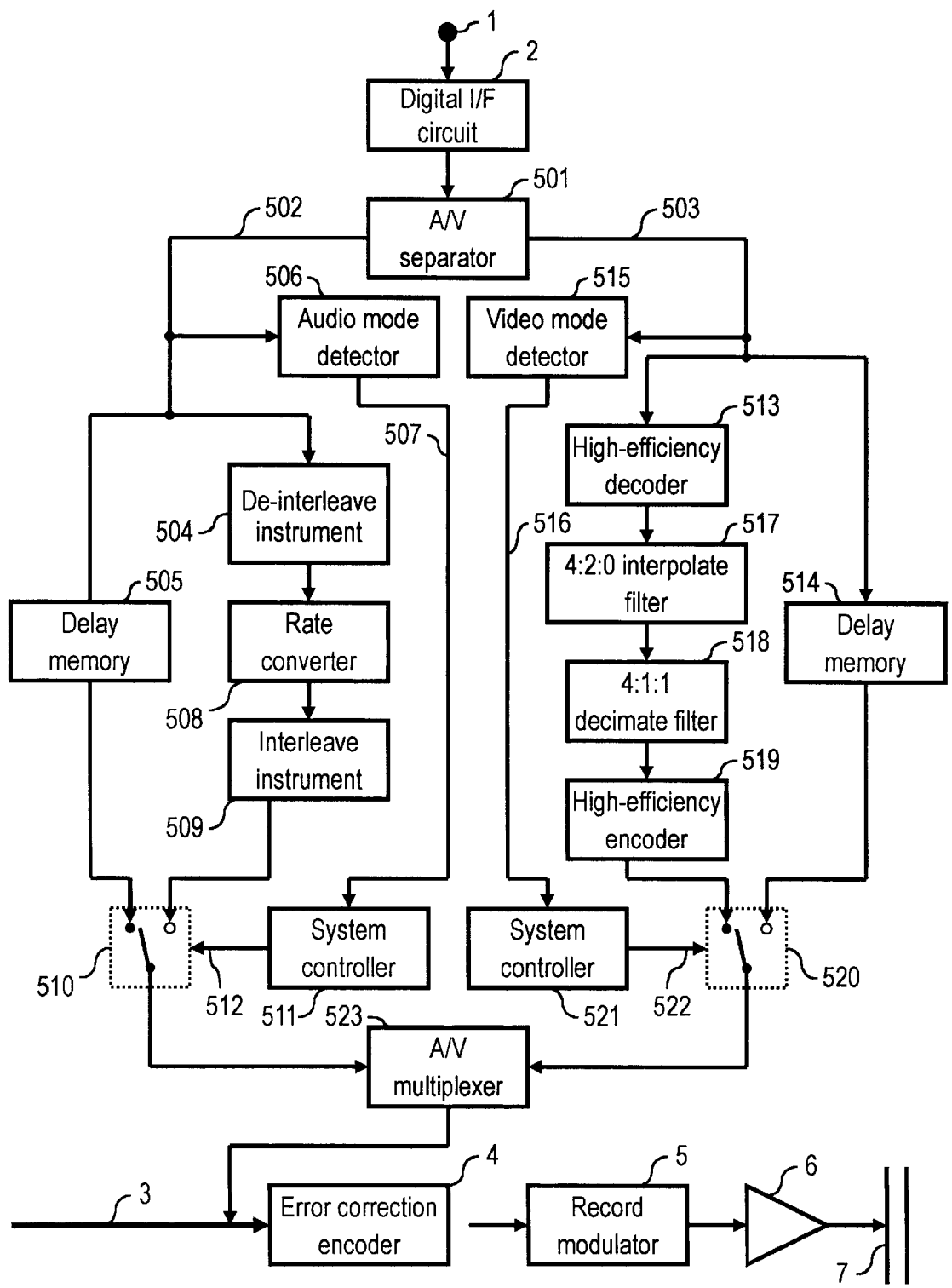
FIG. 8 is a block diagram showing the constitution of a recording apparatus in accordance with a fifth exemplary embodiment of the present invention.

FIG. 8 is a block diagram showing the structure of a recording apparatus in accordance with a fifth exemplary embodiment of the present invention. Those constituent elements similar to those in the conventional are represented by using similar symbols, and description of which are omitted. In FIG. 8, numeral 501 denotes an A/V separator functioning as separating means for separating audio data and video data, 502 is an interleaved audio data, 503 is a high-efficiency encoded video data, 504 is a de-interleave instrument functioning as data reverse-converting means for de-interleaving interleaved audio data, 505 is a delay memory functioning as delay means for delaying audio data 502, 506 is an audio mode detector functioning as audio mode detecting means for detecting the mode of an audio data 502 separated at A/V separator 501, 507 is a mode information detected by audio mode detector 506, 508 is a rate converter functioning as rate converting means, 509 is an interleave instrument functioning as data converting means for interleaving audio data, 510 is a switch functioning as a first selecting means, 511 is a system controller for controlling the operation of the present recording apparatus, 512 is a control signal for switching the switch 510, 513 is a high-efficiency decoder functioning as high-efficiency decoding means for high-efficiency decoding the high-efficiency encoded video data 503, 514 is a delay memory functioning as delay means for delaying video data 503, 515 is a video mode detector functioning as video mode detecting means for detecting the mode of video data 503 separated at A/V separator 501, 516 is a mode information detected at video mode detector 515, 517 is a 4:2:0 interpolate filter functioning as data interpolating means for interpolating the pixel of colour difference signal of the 4:2:0 sampled video data and converting it to the 4:2:2 sampling, 518 is a 4:1:1 decimate filter functioning as data decimating means for converting colour difference signal of the 4:2:2 sampled video data, after applying a ½ band width restricting process in horizontal direction, into a 4:1:1 sampling by decimating every 1 pixel in horizontal direction, 519 is a high-efficiency encoder functioning as high-efficiency encoding means for high-efficiency encoding the 4:1:1 sampled video data, 520 is a switch functioning as a second selecting means, 521 is a system controller for controlling the operation of the present recording apparatus, 522 is a control signal for switching the switch 520, 523 is an A/V multiplexer functioning as multiplexing means for multiplexing audio data and video data.

Operation of the above recording apparatus is described in the following.

A 1394 Format digital signal inputted in terminal 1 is converted into the DV bus data 3 type by digital I/F circuit 2 to be inputted in A/V separator 501. In the A/V separator 501, the inputted data is separated to audio data 502 and video data 503.

Among the data separated at A/V separator 501, audio data 502 is inputted to de-interleave instrument 504 and delay memory 505, and the mode of audio data 502 is detected by audio mode detector 506. The audio data 502 inputted in de-interleave instrument 504 has been interleaved, therefore it undergoes de-interleave processing at de-interleave instrument 504, and then inputted in rate converter 508. In the rate converter 508, the inputted audio data is converted into 48 KHz sampling audio data synchronized with video sampling frequency to be inputted to interleave instrument 509. In the interleave instrument 509, the inputted audio data undergoes interleave processing to be delivered to switch 510. Meanwhile, the audio data 502 inputted in delay memory 505 is delayed taking the above described delays caused by the series of audio data processing into consideration, and delivered to switch 510. The switch 510 selects an audio data in accordance with a control signal 512 established at system controller 511 based on mode information 507 detected by audio mode detector 506. The audio data selected at switch 510 is inputted in A/V multiplexer 523. On the other hand, the video data 503, among the data separated at A/V separator 501, is inputted in high-efficiency decoder 513 and delay memory 514, while video mode detector 515 detects the mode of video data 503. The video data 503 inputted in the high-efficiency decoder 513 has been high-efficiency encoded, therefore it undergoes the high-efficiency decoding process at high-efficiency decoder 513 tobe inputted in 4:2:0 interpolate filter 517. In the 4:2:0 interpolate filter 517, data of 4:2:0 sampling is interpolated by 4:2:2 sampling data, and inputted in 4:1:1 decimate filter 518. In the 4:1:1 decimate filter 518, the 4:2:2 sampling data undergoes a ½ band width restricting process in the horizontal direction and then is decimated to make 4:1:1 sampling, and then delivered to high-efficiency encoder 519. The 4:1:1 sampling video data inputted in high-efficiency encoder 519 is high-efficiency encoded and delivered to switch 520. The video data 503 inputted in delay memory 514 is delayed taking the above described series of delays in the processing of video data into consideration, and then it is delivered to switch 520. The switch 520 selects a video data in accordance with control signal 522 established by system controller 521 based on mode information 516 detected by video mode detector 515. The video data selected by switch 520 is inputted in A/V multiplexer 523. In the A/V multiplexer 523, the inputted audio data and video data are multiplexed to output the DV bus data 3. Error correction encoder 4 adds an error correction parity on the inputted DV bus data 3, record modulator 5 modulates for recording, and the data is recorded in a magnetic tape 7 via record amplifier 6.

In the present recording apparatus, an audio data delivered from 1394 digital interface is judged by mode detector 506 whether the audio data has 625/50 system lock mode or 625/50 system unlock mode. If it is of 625/50 system unlock mode, the rate conversion is applied regardless of the sampling frequency of audio data to be synchronized with the sampling frequency of video. If it is of 625/50 system lock mode, the sampling frequency of audio data has been synchronized with the sampling frequency of video, therefore there is needs for neither the rate conversion nor the frame sequence. Thus the scale of circuit become larger than that in Embodiment 4. However, because no rate conversion is applied when it is lock mode the audio sample data remains as the original sample data, so there is no deterioration with audio data. The video mode detector 515 judges whether the video data inputted through 1394 digital interface is of 625/50 system 4:2:0 sampling, or 625/50 4:1:1 sampling. In a case where it is 625/50 system 4:2:0 sampling, the video data undergoes the high-efficiency decoding, the data compensation and the data decimation for 4:1:1 sampling high-efficiency decoding. In a case where it is 625/50 system 4:1:1 sampling, it has already undergone the 4:1:1 sampling high-efficiency decoding, therefore no further processing is applied (switch 520 selects video data of delay memory 514).

As described in the above, in the exemplary Embodiment 5, the mode of audio data inputted through 1394 digital interface is detected, if the audio data has unlock mode sampled at any desired frequency, or the 48 KHz sampling lock mode, it may be recorded converted in 48 KHz sampling lock mode. The mode of video data inputted through 1394 digital interface is detected either, if it is of 4:2:0 sampling the data may be recorded with 4:1:1 sampling.

With Embodiment 5, it is also possible to implement a conversion apparatus by transmitting DV bus data outputted from A/V multiplexer 523 to any external apparatus using digital I/F circuit 16, in which conversion apparatus the mode of an audio data comming through 1394 digital interface being detected, if the audio data has unlock mode sampled at any desired frequency, or 48 KHz sampling lock mode, it is converted to 48 KHz sampling lock mode to be transmitted to 1394 digital interface, while the mode of a video data comming through 1394 digital interface being detected, if it is of 4:2:0 sampling, the data is transmitted to 1394 digital interface with 4:1:1 sampling.

Although the 1394 digital interface is used as the signal input/output section in Embodiment 5, any other interface may of course be used for the same purpose.

(Embodiment 6)

Figure 9:
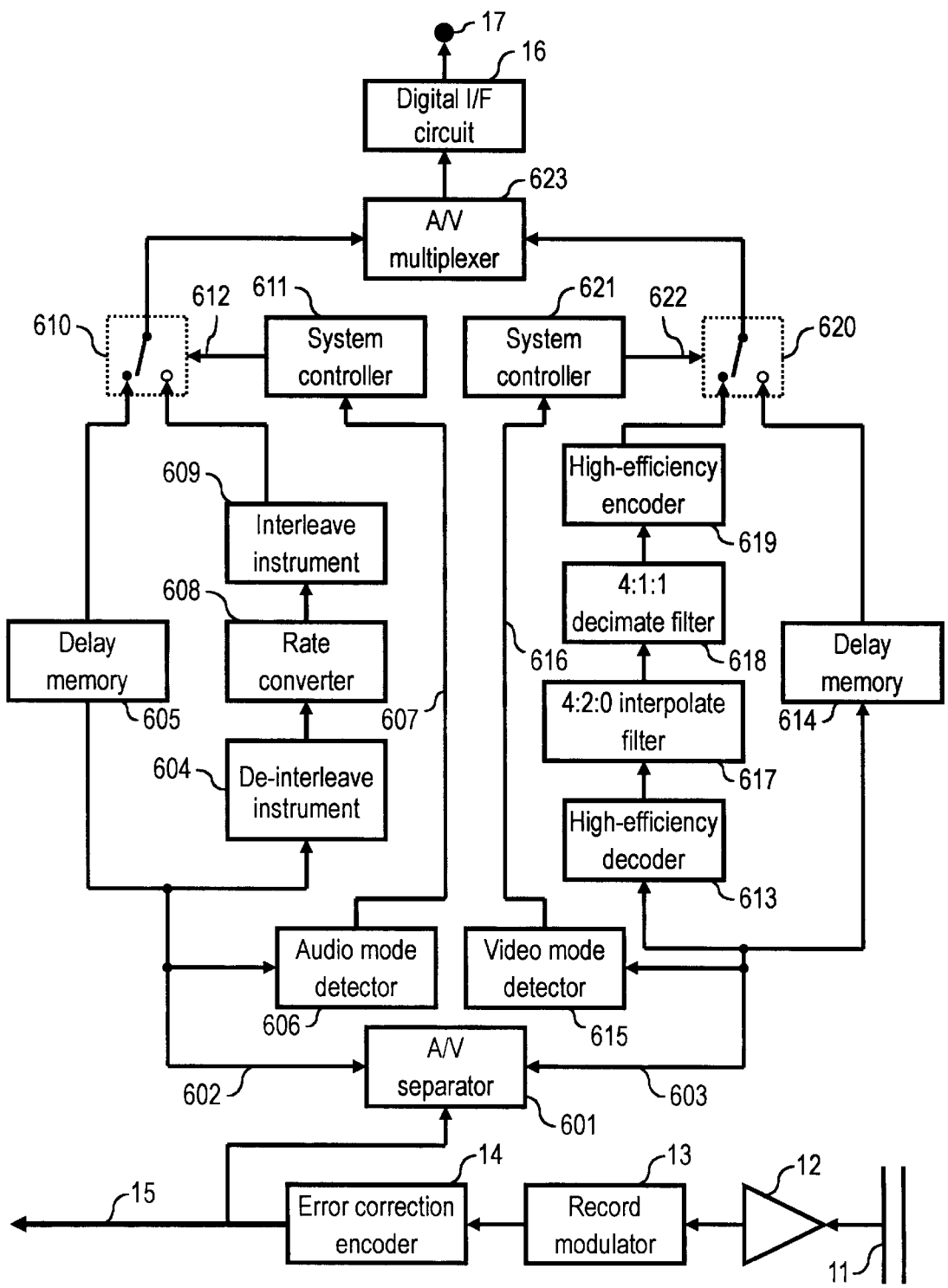
FIG. 9 is a block diagram showing the constitution of a reproducing apparatus in accordance with a sixth exemplary embodiment of the present invention.
Figure 10:
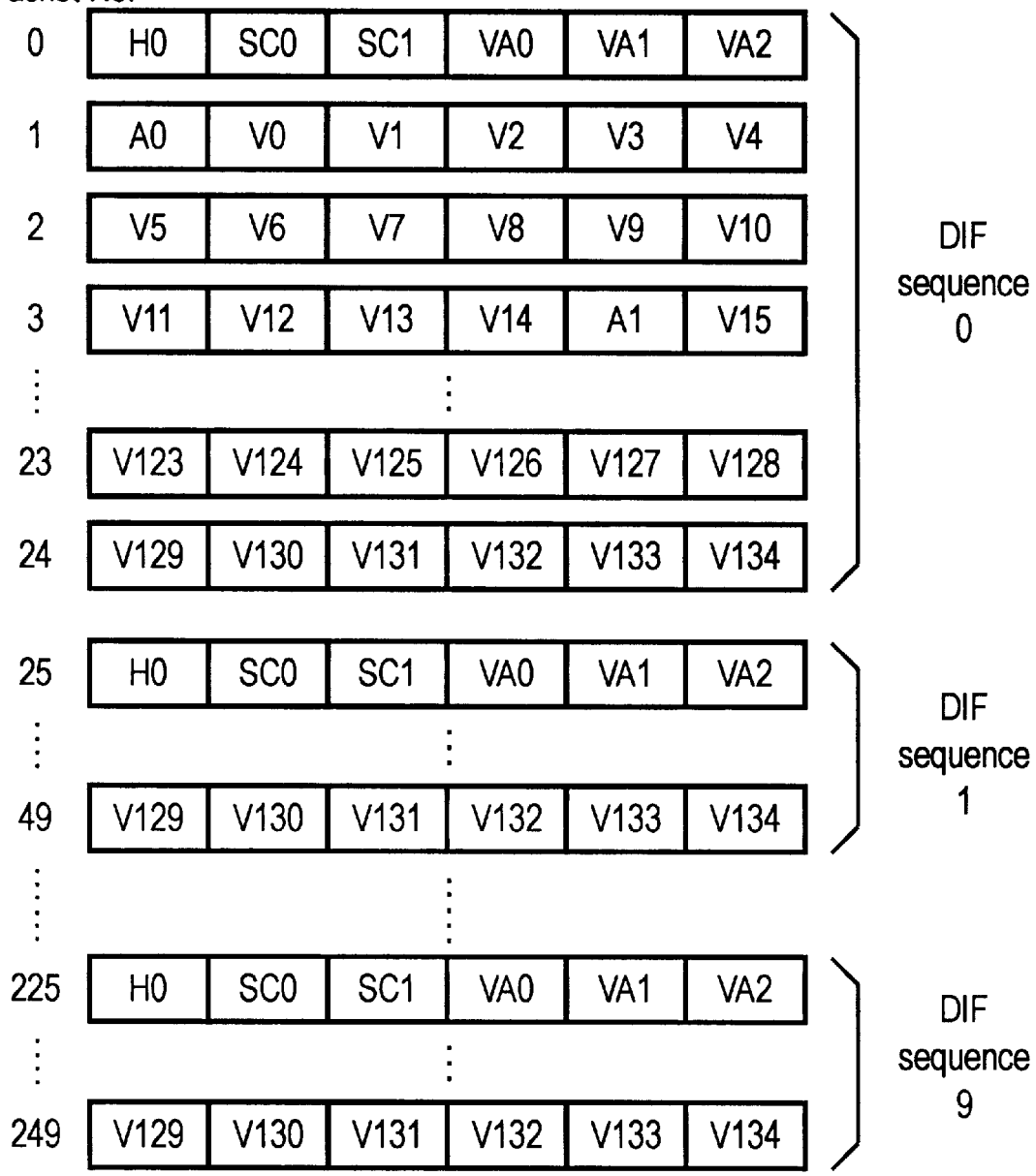
FIG. 10 is a chart used to explain the 1 video frame data using the 1394.
Figure 11:
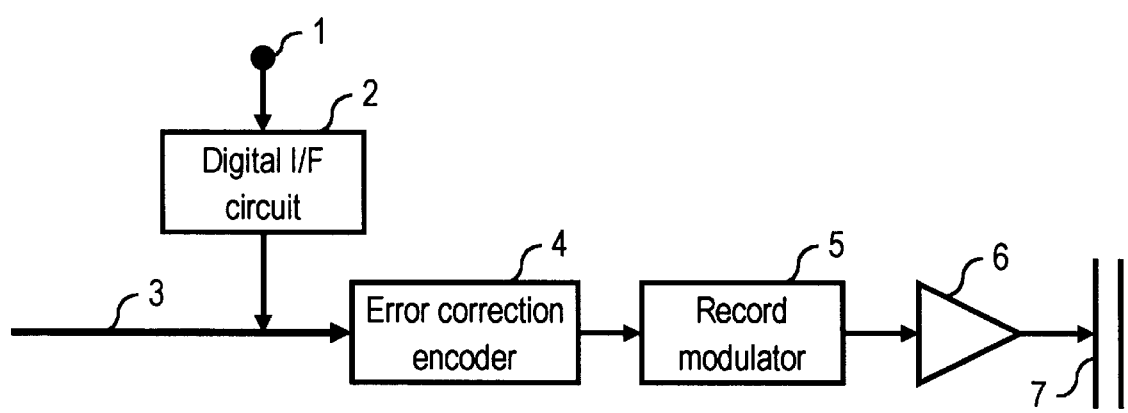
FIG. 11 is a block diagram showing the constitution of a conventional recording apparatus.
Figure 12:
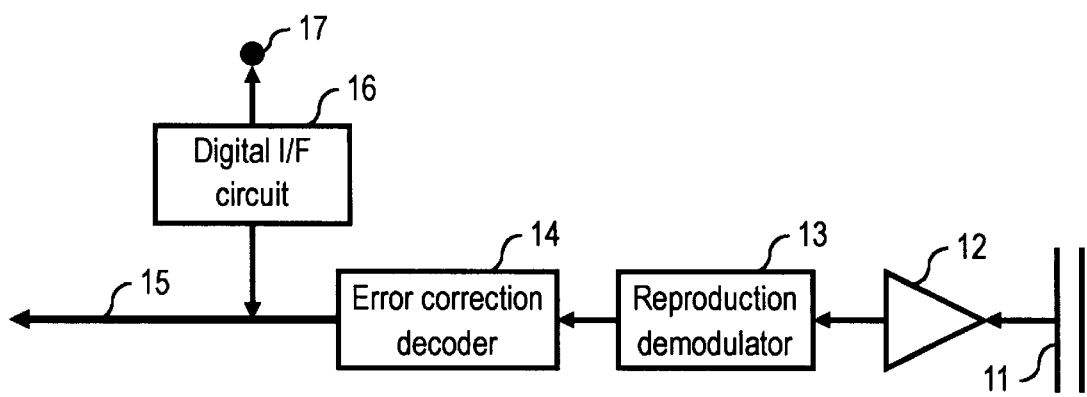
FIG. 12 is a block diagram showing the constitution of a conventional reproducing apparatus.

FIG. 9 is a block diagram showing the structure of a reproducing apparatus in accordance with a sixth exemplary embodiment of the present invention. Those constituent elements similar to those in the conventional are represented by using similar symbols, and description of which are omitted. In FIG. 9, numeral 601 denotes an A/V separator functioning as separating means for separating audio data and video data, 602 is an interleaved audio data, 603 is a high-efficiency encoded video data, 604 is a de-interleave instrument functioning as data reverse-converting means for de-interleaving interleaved audio data, 605 is a delay memory functioning as delay means for delaying audio data 602, 606 is an audio mode detector functioning as audio mode detecting means for detecting the mode of audio data 602 separated at A/V separator 601, 607 is a mode information detected by audio mode detector 606, 608 is a rate converter functioning as rate converting means, 609 is an interleave instrument functioning as data conversion means for interleaving an audio data, 610 is a switch functioning as a first selecting means, 611 is a system controller for controlling the operation of the present reproducing apparatus, 612 is a control signal for switching the switch 610, 613 is a high-efficiency decoder functioning as high-efficiency decoding means for high-efficiency decoding the high-efficiency encoded video data 603, 614 is a delay memory functioning as delay means for delaying video data 603, 615 is a video mode detector functioning as video mode detecting means for detecting the mode of video data 603 separated at A/V separator 601, 616 is a mode information detected by video mode detector 615, 617 is a 4:2:0 interpolate filter functioning as data interpolating means for interpolating the pixel of colour difference signal of 4:2:0 sampled video data and converting it to the 4:2:2 sampling, 618 is a 4:1:1 decimate filter functioning as data decimating means for converting colour difference signal of the 4:2:2 sampled video data, after applying a ½ band width restricting processing in horizontal direction, into a 4:1:1 sampling by decimating every 1 pixel in horizontal direction, 619 is a high-efficiency encoder functioning as high-efficiency encoding means for high-efficiency encoding the 4:1:1 sampled video data, 620 is a switch functioning as a second selecting means, 621 is a system controller for controlling the operation of the present reproducing apparatus, 622 is a control signal for switching the switch 620, 623 is an A/V multiplexer functioning as multiplexing means for multiplexing audio data and video data.

Operation of the above reproducing apparatus is described in the following.

When reproducing a data recorded in magnetic tape 11, the reproduced data is delivered to a reproduction demodulator 13 via reproduction amplifier 12. In the reproduction demodulator 13, the reproduced data undergoes the 0, 1 judgment, and the data that has been modulated for recording is demodulated. The data demodulated at reproduction demodulator 13 is delivered to an error correction decoder 14, the error correction decoder 14 corrects the correctable errors based on an error correction parity added at recording, and outputted in the form of DV bus data 15, and inputted in A/V separator 601. In the A/V separator 601, the inputted data is separated to audio data 602 and video data 603. Among the data separated at A/V separator 601, audio data 602 is inputted in de-interleave instrument 604 and delay memory 605, and the mode of audio data 602 is detected by audio mode detector 606. The audio data 602 inputted in de-interleave instrument 604 has been interleaved, therefore it undergoes de-interleave processing at de-interleave instrument 604, and then inputted in rate converter 608. In the rate converter 608, the inputted audio data is converted into 48 KHz sampling audio data synchronized with video sampling frequency to be inputted in interleave instrument 609. In the interleave instrument 609, the inputted audio data undergoes an interleave processing, and is delivered to switch 610. The audio data delivered to delay memory 605 is delayed taking the above described series of processing delays with audio data into consideration, and then inputted to switch 610. The switch 610 selects an audio data in accordance with control signal 612 established at system controller 611 based on a mode information detected by audio mode detector 606. The audio data selected by the switch 610 is inputted in A/V multiplexer 623. Among the data separated at A/V separator 601, the video data 603 is delivered to high-efficiency demodulator 613 and delay memory 614, and video mode detector 615 detects the mode of video data 603.

The video data 603 inputted in the high-efficiency decoder 613 has been high-efficiency encoded, therefore it undergoes high-efficiency decoding process in the high-efficiency decoder 613 to be delivered to 4:2:0 interpolate filter 617. In the 4:2:0 interpolate filter 617, data of 4:2:0 sampling is interpolated by 4:2:2 sampling data, and inputted in 4:1:1 decimate filter 618. In the 4:1:1 decimate filter 618, the 4:2:2 sampling data undergoes a ½ band width restricting process in the horizontal direction and is decimated to make 4:1:1 sampling, and then delivered to high-efficiency encoder 619. The 4:1:1 sampling video data is high-efficiency encoded and delivered to switch 620. The video data 603 inputted in delay memory 614 is delayed taking the above described series of delays with the processing of video data into consideration, and then the data is delivered to switch 620. The switch 620 selects a video data in accordance with control signal 622 established by system controller 621 based on mode information 616 detected by video mode detector 615. The video data selected by switch 620 is inputted in A/V multiplexer 623. In the A/V multiplexer 623, the inputted audio data and video data are multiplexed to be outputted in the form of DV bus data 15, which is delivered to digital I/F circuit 16. In the digital I/F circuit 16, the DV bus data 15 type signal is converted into 1394 Format digital signal, and then outputted from terminal 17.

In the present reproducing apparatus, audio data reproduced from a recording medium is judged by audio mode detector 606 whether the audio data has 625/50 system lock mode or 625/50 system unlock mode. If it is 625/50 system unlock mode, the rate conversion is applied regardless of the sampling frequency of audio data to be synchronized with the sampling frequency of video. If it is 625/50 system lock mode, the sampling frequency of audio data has been synchronized with the sampling frequency of video, therefore there exists needs for neither rate conversion nor frame sequence. Video data reproduced from a recording medium is judged by video mode detector 615 whether the video data is of 625/50 system 4:2:0 sampling or 625/50 system 4:1:1 sampling. In a case where it is 625/50 system 4:2:0 sampling, the video data undergoes the high-efficiency decoding, the data compensation and the data decimation, for the high-efficiency encoding of 4:1:1 sampling. In a case where it is 625/50 system 4:1:1 sampling, it has already undergone the 4:1:1 sampling high-efficiency encoding, therefore no further processing is applied (switch 620 selects video data of delay memory 614).

As described in the above, in the exemplary Embodiment 6, the mode of audio data reproduced from a recording medium is detected, if the audio data has unlock mode sampled at any desired frequency, or 48 KHz sampling lock mode, it may be converted into 48 KHz sampling lock mode and outputted to 1394 digital interface. The mode of a video data reproduced from a medium is detected, if it is of 4:2:0 sampling it may be outputted to 1394 digital interface with 4:1:1 sampling.

With Embodiment 6, it is also possible to implement a reproducing apparatus by inputting audio data 602, after applying certain specific delay processing, to A/V muliplexer 623, in which reproducing apparatus no conversion process being applied on the audio data reproduced from recording medium, only the video data undergoes the mode detection, if the video data is of 4:2:0 sampling it may be outputted to 1394 digital interface with 4:1:1 sampling.

Although the 1394 digital interface is used as the signal output section in Embodiment 6, any other interface may of course be used for the same purpose.

In the above descriptions, the DVCPRO Format apparatus has been used as the example of recording apparatus and reproducing apparatus. However, it is not the intention to limit to the Format. A tape has been exemplified in the above descriptions as the recording medium, but any other recording medium may of course be used for the same effect.

INDUSTRIAL APPLICABILITY

In the field of recording/reproducing apparatus such as digital VCR, the present invention may implement a recording apparatus which can record data transmitted through digital interface, a reproducing apparatus which can output reproduced data using digital interface, and a conversion apparatus which can convert data transmitted through digital interface and output, even if there are difference in the form of audio sampling and/or video compression.

What is claimed is:

1. An apparatus for processing a first digital signal having a first format comprising:

an interface for receiving the first digital signal having the first format and converting the first digital signal into a second digital signal having a second format;

a separator for separating the second digital signal into a first data signal and a second data signal;

a first data converter for de-interleaving the first data signal and outputting a first de-interleaved data signal having a first frequency;

a rate converter for converting the first de-interleaved data signal having the first frequency into a second de-interleaved data signal having a second frequency; and a second data converter for interleaving the second de-interleaved data signal having the second frequency.

2. An apparatus for processing a first digital signal having a first format comprising:

an interface for receiving the first digital signal having the first format and converting the first digital signal into a second digital signal having a second format;

a separator for separating the second digital signal into a first data signal and a second data signal;

a mode detector for detecting a data mode of the first data signal;

a first data converter for de-interleaving the first data signal and outputting a first de-interleaved data signal having a first frequency;

a rate converter for converting the first de-interleaved data signal having the first frequency into a second de-interleaved data signal having a second frequency;

a selector for selecting and outputting one of the first de-interleaved data signal having the first frequency and the second de-interleaved data signal having the second frequency based on the data mode of the first data signal detected by the mode detector; and a second data converter for interleaving the output of the selector.

3. An apparatus for processing a first digital signal comprising:

a separator for separating the first digital signal into a first data signal and a second data signal;

a mode detector for detecting a data mode of the first data signal;

a first data converter for de-interleaving the first data signal and outputting a first de-interleaved data signal having a first frequency, a rate converter for converting the first de-interleaved data signal having the first frequency into a second de-interleaved data signal having a second frequency;

a selector for selecting and outputting one of the first de-interleaved data signal having the first frequency and the second de-interleaved data signal having the second frequency based on the data mode of the first data signal detected by the mode detector; and a second data converter for interleaving the output of the selector.

4. An apparatus for processing a first digital signal having a first format comprising:

an interface for receiving the first digital signal having the first format and converting the first digital signal into a second digital signal having a second format;

a separator for separating the second digital signal into a first data signal and first encoded data signal;

a mode detector for detecting a data mode of the first encoded data signal;

a decoder for decoding the first encoded data signal and outputting a decoded data signal having a first sampling format;

a converter for converting the decoded data signal having the first sampling format into a second decoded data signal having a second sampling format;

an encoder for encoding the second decoded data signal having the second format and outputting a second encoded data signal;

means for delaying the first encoded data signal and outputting a delayed data signal; and a selector for selecting and outputting one of the second encoded data signal and the delayed data signal based on the data mode of the first encoded data signal detected by the mode detector.

5. An apparatus for processing a digital signal comprising:

a separator for separating the digital signal into a first data signal and a first encoded data signal;

a mode detector for detecting a data mode of the first encoded data signal;

a decoder for decoding the first encoded data signal and outputting a decoded data signal having a first sampling format;

a converter for converting the decoded data signal having the first sampling format into a second decoded data signal having a second sampling format;

an encoder for encoding the second decoded data signal having the second format and outputting a second encoded data signal;

means for delaying the first encoded data signal and outputting a delayed data signal; and a selector for selecting and outputting one of the second encoded data signal and the delayed data signal based on the data mode of the first encoded data signal detected by the mode detector.

6. An apparatus for processing a first digital signal having a first format comprising:

an interface for receiving the first digital signal having the first format and converting the first digital signal into a second digital signal having a second format;

a separator for separating the second digital signal into an interleaved data signal and a first encoded data signal;

data de-interleaving means for de-interleaving the interleaved data signal and outputting a first de-interleaved data signal having a first sampling format;

a rate converter for converting the first de-interleaved data signal having the first sampling format into a second de-interleaved data signal having a second sampling format;

a data converter for interleaving the second de-interleaved data signal;

a mode detector for detecting a data mode of the first encoded data signal;

a decoder for decoding the first encoded data signal and outputting a first decoded data signal having a third sampling format;

a sampling converter for converting the first decoded data signal having the third sampling format into a second decoded data signal having a fourth sampling format;

an encoder for encoding the second decoded data signal and outputting a second encoded data signal;

delay means for delaying the first encoded data signal and outputting a delayed data signal; and a selector for selectively outputting one of the second encoded data signal and the delayed data signal based on the data mode of the first encoded data signal detected by the mode detector.

7. An apparatus for processing a first digital signal having a first format comprising:

an interface for receiving the first digital signal having the first format and converting the first digital signal into a second digital signal having a second format;

a separator for separating the second digital signal into a first interleaved data signal and a first encoded data signal;

a mode detector for detecting a first data mode of the first encoded data signal and a second data mode of the first interleaved data signal;

data de-interleaving means for de-interleaving the first interleaved data signal and outputting a first de-interleaved data signal having a first sampling format;

a rate converter for converting the first de-interleaved data signal having the first sampling format into a second de-interleaved data signal having a second sampling format;

a data converter for interleaving the second de-interleaved data signal and outputting a second interleaved data signal;

delay means for delaying the first encoded data signal and outputting a first delayed data signal and for delaying the first interleaved data signal and outputting a second delayed data signal;

a first selector for selectively outputting one of the second interleaved data signal and the second delayed data signal based on the second data mode;

a decoder for decoding the first encoded data signal and outputting a first decoded data signal having a third sampling format;

a sampling converter for converting the first decoded data signal having the third sampling format into a second decoded data signal having a fourth sampling format;

an encoder for encoding the second decoded data signal and outputting a second encoded data signal; and a second selector for selectively outputting one of the second encoded data signal and the first delayed data signal based on the first data mode.

8. An apparatus for processing a digital signal comprising:

a separator for separating the first digital signal into a first data signal and a second data signal;

a mode detector for detecting a first data mode of the first data signal and a second data mode of the second data signal;

data de-interleaving means for de-interleaving the second data signal and outputting a first de-interleaved data signal having a first sampling format;

a rate converter for converting the first de-interleaved data signal having the first sampling format into a second de-interleaved data signal having a second sampling format;

a data converter for interleaving the second de-interleaved data signal and outputting an interleaved data signal;

delay means for delaying the first data signal and outputting a first delayed data signal and for delaying the second data signal and outputting a second delayed data signal;

a first selector for selectively outputting one of the interleaved data signal and the second delayed data signal based on the second data mode;

a decoder for decoding the first data signal and outputting a first decoded data signal having a third sampling format;

a sampling converter for converting the first decoded data signal having the third sampling format into a second decoded data signal having a fourth sampling format;

an encoder for encoding the second decoded data signal and outputting an encoded data signal; and a second selector for selectively outputting one of the second encoded data signal and the first delayed data signal based on the first data mode.

9. The processing apparatus of claim 4, wherein the converter is comprised of data interpolating means for interpolating data and data decimating means for decimating data interpolated at said data interpolating means.

10. The processing apparatus of claim 5, wherein the converter is comprised of data interpolating means for interpolating data and data decimating means for decimating data interpolated at said data interpolating means.

11. The processing apparatus of claim 2, wherein the mode detector performs detection by judging whether the sampling frequency of the first data signal is in synchronization with the sampling frequency of the second data signal.

12. The processing apparatus of claim 3, wherein the mode detector performs detection by judging whether the sampling frequency of the first data signal is in synchronization with the sampling frequency of the second data signal.

13. The processing apparatus of claim 4, wherein the mode detector performs detection by judging whether the first encoded data signal is an encoded signal with a first bandwidth restriction, or an encoded signal with a second bandwidth restriction.

14. The processing apparatus of claim 5, wherein the mode detector performs detection by judging whether the first encoded data signal is an encoded signal with a first bandwidth restriction, or an encoded signal with a second bandwidth restriction.

15. The processing apparatus of claim 6, wherein the sampling converter is comprised of data interpolating means for interpolating data and data decimating means for decimating data interpolated at said data interpolating means.

16. The processing apparatus of claim 7, wherein the sampling converter is comprised of data interpolating means for interpolating data and data decimating means for decimating data interpolated at said data interpolating means.

17. The processing apparatus of claim 8, wherein the sampling converter is comprised of data interpolating means for interpolating data and data decimating means for decimating data interpolated at said data interpolating means.

18. The processing apparatus of claim 7, wherein the mode detector performs detection by judging whether the sampling frequency of the first encoded data signal is in synchronization with the sampling frequency of the first interleaved data signal.

19. The processing apparatus of claim 8, wherein the mode detector performs detection by judging whether the sampling frequency of the first data signal is in synchronization with the sampling frequency of the second data signal.

20. The processing apparatus of claim 6, wherein the mode detector performs detection by judging whether the first encoded data signal is an encoded signal with a first bandwidth restriction, or an encoded signal with a second bandwidth restriction.

21. The processing apparatus of claim 7, wherein the mode detector performs detection by judging whether the first encoded data signal is an encoded signal with a first bandwidth restriction, or an encoded signal with a second bandwidth restriction.

22. The processing apparatus of claim 8, wherein the mode detector performs detection by judging whether the first data signal is an encoded signal with a first bandwidth restriction, or an encoded signal with a second bandwidth restriction.

* * * * *